(No Model.)
J. D. CHANNELL.
BELTING.
No. 344,563. Patented June 29, 1886.
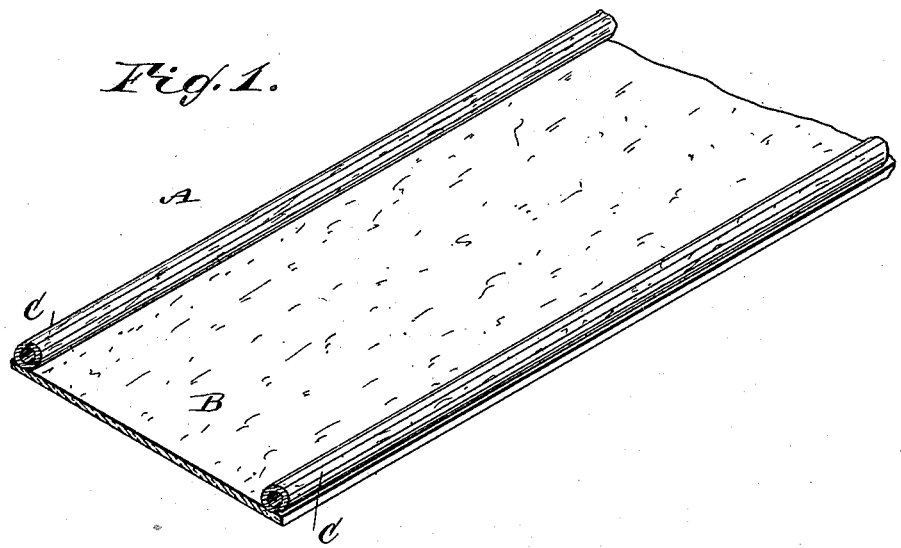
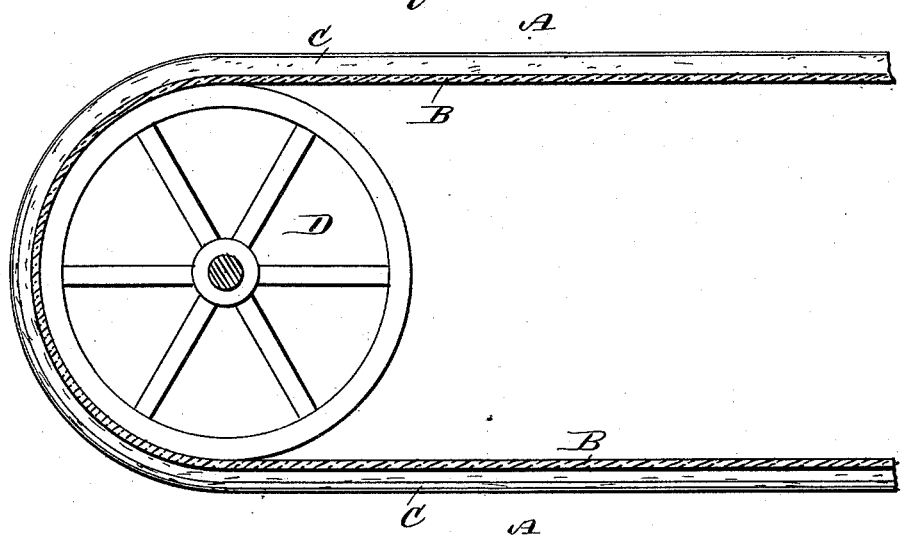
WITNESSES:
Theo. G. Hoster
C. Sedgwick
INVENTOR:
J. D. Channell
BY Munn & Co.
ATTORNEYS.

UNITED STATES PATENT OFFICE.

JOHN D. CHANNELL, OF NEVADA CITY, CALIFORNIA.

BELTING.

SPECIFICATION forming part of Letters Patent No. 344,563, dated June 29, 1886.

Application filed November 2, 1885. Serial No. 181,609. (No model.)

*To all whom it may concern:*

Be it known that I, JOHN D. CHANNELL, of Nevada City, in the county of Nevada and State of California, have invented a new and Improved Belt, of which the following is a full, clear, and exact description.

The object of my invention is to provide a new and improved belt having flexible flanges.

The invention consists of a band provided on its upper face on each side with a hollow flexible tube.

Reference is to be had to the accompanying drawings, forming a part of this specification, in which similar letters of reference indicate corresponding parts in both the figures.

Figure 1 is a perspective view of my improved belt. Fig. 2 is a sectional side elevation of my improved belt passing over a pulley.

The belt A consists of the band B, made of any suitable material—such as leather, rubber, &c.—and of the flexible hollow tubes C, which are permanently attached in any suitable manner to one face of the band B near its edges, so as to form a belt with a flange on each side.

The hollow tubes C are preferably made of rubber; but any similar material will answer the purpose.

It will be seen that if an endless belt is formed and passed over a pulley, D, as shown in Fig. 2, the flexibility of the hollow tubes C will then permit an easy adjustment of the tube to the circular form of the pulley without breaking the flanges on the sides of the band B. This belt is especially adapted for use in ore-concentrators and all other machines in which a belt with flanges is desirable for conveying water, pulp, and similar material from one place to another without the aid of buckets, guides, &c.

Having thus fully described my invention, I claim as new and desire to secure by Letters Patent—

1. A belt consisting of a band provided near each edge on its upper side with a hollow flexible tube, substantially as shown and described.

2. A belt of any suitable material, having side flanges which are formed of hollow flexible tubes attached permanently to the faces of said belt, substantially as shown and described.

JOHN D. CHANNELL.

Witnesses:
GEORGE G. ALLAN,
CHARLES GRIMES.